United States Patent
Lu et al.

(10) Patent No.: US 7,211,534 B2
(45) Date of Patent: May 1, 2007

(54) PREPARATION OF A MAGNESIUM HALIDE SUPPORT FOR OLEFIN POLYMERIZATION AND A CATALYST COMPOSITION USING THE SAME

(75) Inventors: Honglan Lu, Port Lavaca, TX (US);
Gapgoung Kong, Sugarland, TX (US);
Zhongyang Liu, Port Lavaca, TX (US);
Chih-Jian Chen, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 109 days.

(21) Appl. No.: 10/365,558

(22) Filed: Feb. 12, 2003

(65) Prior Publication Data

US 2004/0157727 A1    Aug. 12, 2004

(51) Int. Cl.
*B01J 31/00* (2006.01)

(52) U.S. Cl. .................. 502/115; 502/132; 502/134; 502/169; 502/171

(58) Field of Classification Search .............. 502/103, 502/102, 150, 115, 132–134, 169, 171
See application file for complete search history.

(56) References Cited

U.S. PATENT DOCUMENTS

| | | | | |
|---|---|---|---|---|
| 4,302,566 A | | 11/1981 | Karol et al. ................ 526/125 |
| 4,458,027 A | * | 7/1984 | Berge et al. ................. 502/104 |
| 4,471,066 A | * | 9/1984 | Sakurai et al. .............. 502/113 |
| 4,478,221 A | | 10/1984 | Heiss ........................ 128/334 |
| 4,814,313 A | * | 3/1989 | Murata et al. .............. 502/111 |
| 4,987,212 A | | 1/1991 | Morterol et al. ......... 526/348.4 |
| 5,047,468 A | | 9/1991 | Lee et al. ..................... 525/53 |
| 5,091,353 A | | 2/1992 | Kioka et al. ................ 502/111 |
| 5,192,731 A | | 3/1993 | Kioka et al. ................ 502/110 |
| 5,260,245 A | | 11/1993 | Mink et al. ................. 502/115 |
| 5,336,652 A | | 8/1994 | Mink et al. ................. 502/125 |
| 5,561,091 A | | 10/1996 | Mink et al. ................. 502/115 |
| 5,623,033 A | * | 4/1997 | Kioka et al. ............. 526/124.8 |
| 5,990,034 A | | 11/1999 | Nozaki ....................... 502/132 |
| 6,114,276 A | * | 9/2000 | Kong et al. ................. 502/226 |
| 6,303,532 B1 | * | 10/2001 | Garoff et al. ............... 502/127 |
| 6,412,328 B1 | | 7/2002 | Cavallaro et al. ............ 73/1.74 |
| 6,429,327 B1 | * | 8/2002 | Sims et al. .................. 556/480 |
| 6,723,865 B2 | * | 4/2004 | Evain et al. ................. 556/482 |
| 6,831,032 B2 | * | 12/2004 | Spaether ..................... 502/103 |

FOREIGN PATENT DOCUMENTS

EP        0 703246 A1    9/1994

* cited by examiner

*Primary Examiner*—Karl Group
(74) *Attorney, Agent, or Firm*—Howrey LLP

(57) ABSTRACT

A magnesium halide support material for a polyolefin catalysts is disclosed. The magnesium halide of present invention is prepared by reacting magnesium with an alkylhalide in a non-polar hydrocarbon solvent. Preparation of the support does not require the use electron donating solvents and therefore does not require extensive washing to remove the solvent from the support.

5 Claims, No Drawings

PREPARATION OF A MAGNESIUM HALIDE SUPPORT FOR OLEFIN POLYMERIZATION AND A CATALYST COMPOSITION USING THE SAME

FIELD OF THE INVENTION

The present invention relates catalyst compositions useful for olefin polymerization reactions, and more particularly to a method of preparing a magnesium halide support from magnesium powder and an alkylhalide using a non-polar solvent.

BACKGROUND OF THE INVENTION

Magnesium halide is a key component of titanium based Ziegler-Natta catalysts which have been used extensively in the polyolefin industry over the past 50 years. These catalysts are typically composed of titanium incorporated onto the surface of a magnesium halide support. It has been recognized that the catalyst properties depend heavily on the chemical and physical properties of magnesium halide support and the support properties influence the morphology of the resulting polymer. Consequently, there has been intense effort directed to preparing active magnesium halide supports for olefin polymerization catalysts.

Most of the methods known in the art for preparing such magnesium halide supports utilize various electron donating solvents such as alcohol, ester, siloxy, and ether compounds. For example, U.S. Pat. Nos. 4,987,212 and 4,642,328 discloses methods involving the reaction of $R_2Mg$ solution with an alkylhalide in a mixed solvent of ether and heptane. U.S. Pat. Nos. 5,091,353 and 5,192,732 describe a method wherein magnesium halide containing aluminum is precipitated from an alcohol solution of magnesium halide by the addition of alkylaluminum compounds to the solution. In a method described in U.S. Pat. No. 4,302,566, THF is mixed with magnesium halide and titanium halide compounds to make a solution from which a solid catalyst component is prepared by re-precipitation.

Method for preparing a magnesium halide support that utilize electron donating solvents suffer the drawback that excessive amounts of the electron donating solvent can intercalate into the matrix of the support and 'poison' the catalyst. As a result, it is often necessary to extensively wash the matrix with non-polar solvents or to treat the matrix with strong Lewis acids to remove excessive electron donating solvent. These steps lengthen the preparation process and themselves can potentially contaminate or poison the catalyst.

U.S. Pat. No. 4,478,221 and European Patent No. 0 703 246 A1 describe a method that does not utilize an electron donating solvent, wherein magnesium metal powder is reacted with butylchloride in a non-polar solvent in the presence of $Ti(OR)_4$ to initiate the reaction and then further treatment with $TiCl_4/Ti(OR)_4$/butylchloride results in a magnesium halide supported catalyst. According to this method, the active titanium catalyst is formed concomitantly with the precipitation of the magnesium halide support. This makes it difficult to control the homogeneity of the active site, therefore, polymers synthesized using these catalysts display broad molecular distributions. Also, the catalytic amount of $Ti(OR)_4$ used to initiate the reaction between magnesium powder and butylchloride results in a tiny amount of $Ti(OR)_4$-formed active site within the magnesium halide support itself. This active site displays formidable activity and competes with the desired active catalyst, producing heterogeneous polymers. It is therefore difficult to employ a magnesium halide support formed in this manner as a support for olefin polymerization.

The reaction between magnesium and alkylhalide is seldom successful without using titanium compounds such as $TiCl_4$ or $Ti(OR)_4$ to initiate the reaction. It would be beneficial to develop a new method to initiate the reaction between magnesium and alkyl halide without using titanium compounds.

U.S. Pat. No. 5,990,034 describes a method wherein a mixture of alkylaluminum and alkylmagnesium is reacted with chlorosilane containing a Si—H bond to produce a magnesium halide support without using an ether solvent. However, alkylmagnesium compounds are expensive, so this method for preparing a magnesium halide support is not cost effective.

SUMMARY OF THE INVENTION

Accordingly, the present invention provides a magnesium halide support for an olefin polymerization catalyst, wherein the preparation of support does not require an electron donating solvent. According to one embodiment, the support is prepared by one aspect of the present invention is a catalyst composition for olefin polymerization comprising a magnesium halide support and a titanium catalyst component, wherein the magnesium halide support is prepared by:

providing magnesium and an alkylhalide in a non-polar hydrocarbon medium, preparing a zirconium complex by reacting a zirconium halide with an alcohol, providing the zirconium complex to the non-polar hydrocarbon medium to initiate a reaction between the magnesium and the alkylhalide, the reaction yielding a magnesium halide support, and recovering the magnesium halide support.

According to another embodiment, the magnesium halide support is prepared by:

providing magnesium and an alkylhalide in a non-polar hydrocarbon medium, providing aluminum alkoxide compound having the formula $Al(OR)_3$ wherein R is a hydrocarbon to the non-polar hydrocarbon medium to initiate a reaction between the magnesium and the alkylhalide, the reaction yielding a magnesium halide support, and recovering the magnesium halide support.

The solid magnesium halide support of the present invention typically has the formula $Mg_pX_q(OR)_rM_s$, where M is Al or Zr, R is alkyl, X is halide, and p, q, r, and s are numbers. Contact reaction between the support and a titanium compound yields a titanium based catalysts.

A further aspect of the invention is a titanium-based catalyst for olefin polymerization, wherein the catalyst utilizes a magnesium halide support, as described above.

DETAILED DESCRIPTION

Generally, the reaction between magnesium and alkylhalide to make an magnesium halide support has been performed in an electron donating ether solvent such as tetrahydrofuran, diethylether, or dibutylether. The reaction between magnesium powder and alkylhalide is difficult to initiate without using these solvents.

The present invention provides a method wherein the reaction between magnesium and an alkylhalide is initiated in the presence of either a zirconium compound (A-1), which is obtained from the reaction of zirconium halide with an alcohol, or in the presence of an aluminum alkoxide Al(OR)$_3$, which is obtained from the reaction between an alkylaluminum and an alcohol. Reaction between magnesium and alkylhalide produces a magnesium halide support in a non-polar aliphatic solvent such as hexane and heptane. This method does not require the use of an electron donating solvent and is also advantageous with regard to production cost because only small amounts of (A-1) or Al(OR)$_3$ are required.

Initiation of the reaction between magnesium powder and an alkyl halide in the presence of zirconium compound (A-1). Zirconium compounds (A-1) are prepared by reacting a zirconium halide with an alcohol. The resulting product (A-1) can be used directly, without purification or characterization, to initiate the reaction of magnesium with an alkylhalide. The reaction product (A-1) is preferentially soluble in hydrocarbon solvents such as hexane or heptane as described in reaction (1):

$$\text{ZrX}_4 + n \text{ ROH} + \text{hydrocarbon solvent} \longrightarrow (A\text{-}1) \quad \text{Reaction (1)}$$

Examples of suitable zirconium halides include zirconium chloride, zirconium bromide, zirconium fluoride, and zirconium iodide. Examples of suitable alcohols include aliphatic alcohols having 2 to 14 carbon atoms such as n-butanol and 2-ethylhexanol. The molar ratio of alcohol to zirconium can be from about 1 to about 6. Generally, increasing the amount of alcohol relative to the amount of zirconium increase the particle size of the resulting magnesium halide support. Because the alcohol is employed as a reagent and not as a solvent, extensive washing is not required to remove the excess alcohol.

The reaction between magnesium and alkylhalide is initiated in the presence: of (A-1) in non-polar solvent such as hexane or heptane. Once initiated, further reaction with alkylhalide results in the formation of solid magnesium halide support, as shown in reaction (2):

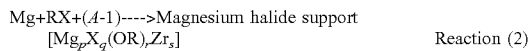
$$\text{Mg} + \text{RX} + (A\text{-}1) \longrightarrow \text{Magnesium halide support } [\text{Mg}_p\text{X}_q(\text{OR})_r\text{Zr}_s] \quad \text{Reaction (2)}$$

Magnesium is typically provided in the form of magnesium powder. Examples of suitable alkylhalides include aliphatic halide compounds represented by formula RX, where R is hydrocarbon having 2 to 14 carbon atom such as ethyl, propyl, butyl, pentyl, heptyl, octyl, and X is halide. The molar ratio of alkylhalide to magnesium in the reaction is typically about 0.5 to about 3.0 and the molar ratio of zirconium to magnesium is typically about 0.01 to about 0.3.

The resulting magnesium halide support typically contains about 1 to about 10% zirconium metal which is incorporated during the initiation of the reaction between magnesium and alkylhalide. The zirconium component that is incorporated into the resulting magnesium halide does not catalyze olefin polymerization and therefore does not contribute to heterogeneity of the resulting polymer when the magnesium halide is used as a support material for titanium based catalyst.

Initiation of the reaction between magnesium metal and alkylhalide using (A-1) is typically carried out at a temperature greater than about 50° C. Once initiated, the reaction is sustained by continuously feeding the reaction with alkylhalide and a sufficient amount of (A-1) to keep the reaction going until all the magnesium metal powder is consumed. After all the magnesium powder has disappeared from the mixture, further reaction at about 40° C. and 100° C. for about 1 to about 4 hours completes the reaction to form the magnesium halide support.

Initiation of the reaction between magnesium powder and an alkyl halide in the presence of aluminum alkoxide. The reaction between magnesium and alkylhalide can also be initiated in the presence of aluminum alkoxide represented by formula Al(OR)$_3$, where R is an aliphatic hydrocarbon. Suitable aluminum alkoxides can be purchased or can be obtained by reacting the corresponding alkylaluminum with an alcohol. As described in reaction (3), the reaction between magnesium powder and alkylhalide in the presence of Al(OR)$_3$ produces a magnesium halide support that likely has the composition [Mg$_p$X$_q$(OR)$_r$Al$_s$]. The reaction is performed in non-polar solvent such as hexane and heptane at elevated temperature.

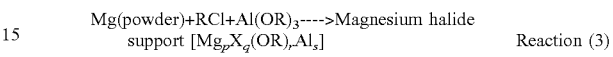
$$\text{Mg(powder)} + \text{RCl} + \text{Al(OR)}_3 \longrightarrow \text{Magnesium halide support } [\text{Mg}_p\text{X}_q(\text{OR})_r\text{Al}_s] \quad \text{Reaction (3)}$$

Suitable solvents for reaction (3) include hexane and heptane. The molar ratio of alkylhalide to magnesium is typically about 1.0 to about 3.0 and the molar ratio of Al(OR)$_3$ to magnesium is typically about 0.01 to about 0.3.

The reaction between magnesium powder and alkylhalide is initiated using a catalytic amount of Al(OR)$_3$ at a temperature of about 60 to about 100° C. Once initiated, the reaction is sustained by continuously feeding the reaction with alkylhalide and a sufficient amount of Al(OR)$_3$ to keep the reaction going until all the magnesium powder in the mixture is consumed. Further stirring at about 60 to about 100° C. for about 1 to about 4 hours completes the reaction to form a magnesium halide support.

This reaction produces granular type magnesium halide supports having composition of [Mg$_p$X$_q$(OR)$_r$M$_s$] with an average particle size of about 15 to about 75 μm. The particle size can be adjusted by varying the alkoxide group and/or the reaction temperature. This method for preparing a magnesium halide support is very advantageous in terms of manufacturing cost because it does not involve any electron donating solvent and therefore does not require extensive washing to remove intercalated solvent.

Highly active catalysts can be prepared by contact reaction between the above described magnesium halide supports and titanium halide compounds represented by formula TiL$_n$X$_{4-n}$, where L is non-halide ligand and X is halide. Such a contact reaction can be carried out in a hydrocarbon solvent. For example, titanium alkoxy halide compounds represented by formula Ti(OR)$_{4-n}$X$_n$ or titanium amide halide compounds represented by Ti(NR$_2$)$_{4-n}$X$_n$, wherein R is alkyl, X is halide, and n is number less than 4, can be reacted with the magnesium halide support in hydrocarbon solvent to incorporate a titanium active center into the support, providing a highly active catalyst. Alternatively, organometallic titanium compounds containing a π-ligand such as cyclopentadienyl or a derivatives of a cyclopentadienyl ligand such as indene, fluorine, or a chelating amide ligand such as carbodiimide or β-ketimidate can be reacted with the magnesium halide support to provide a corresponding catalyst. Upon incorporation of a proper titanium component, the magnesium halide support prepared according to the present invention can be used as a titanium catalyst for olefin polymerization, e.g., polyethylene and polypropylene.

Preparation of a highly active catalyst for ethylene polymerization. A highly active catalyst composition can be prepared by reacting the magnesium halide support prepared above with titanium halide compounds, represented by formula Ti(OR)$_{4-n}$X$_n$ where X is a halide, R is an alkyl group, and n is number less than 4. The magnesium halide support and titanium halide compounds are reacted such that Ti/Mg atomic ratio is in the range of about 0.01 to about 2.0, more typically about 0.1 to about 1.0. The contact reaction is carried out in a hydrocarbon medium at a temperature of about 20 to about 100° C. for about 1 to about 6 hours. Examples of suitable titanium compounds include titanium tetrahalides such as $TiCl_4$, $TiBr_4$, $TiI_4$, alkoxy titanium halides such as $Ti(OCH_3)Cl_3$, $Ti(OC_2H_5)Cl_3$, $Ti(OC_4H_9)Cl_3$, $Ti(OC_8H_{17})Cl_3$, $Ti(OCH_3)_2Cl_2$, $Ti(OC_2H_5)_2Cl_2$, $Ti(OC_4H_9)_2Cl_2$, $Ti(OC_8H_{17})_2Cl_2$, and tetraalkoxy titaniums such as $Ti(OCH_3)_4$, $Ti(OC_2H_5)_4$, $Ti(OC_4H_9)_4$.

Preparation of a high performance catalyst for ethylene co-polymerization. The magnesium halide support described above can be utilized to make a high performance catalyst for producing ethylene co-polymer having narrow molecular weight distribution and homogeneous compositional distribution. According to one embodiment, a high performance catalyst is prepared by:
- treating the magnesium halide support with aluminum compounds obtained from the reaction of $R_3Al$ with an amine or an alcohol;
- contact reaction between the support and a titanium halide compound represented by formula $Ti(OR)_{4-n}X_n$, to produce a titanium-containing precursor catalyst, where R is alkyl and X is halide; and
- treatment of the precursor catalyst with mixture of an alkylmagnesium compound and an aluminum compounds obtained from the reaction of $R_3Al$ with an amine or an alcohol.

Suitable aluminum compounds are prepared by reacting $R_3Al$ with a secondary alkylamine. The reaction can be carried out at room temperature for about 1 to about 3 hours. Treatment of the magnesium halide support with the aluminum compound is carried out such that Al/Mg atomic ratio is about 0.05 to about 1.0 and the temperature is preferably about 20 to about 80° C. in a non-polar solvent such as hexane or heptane. Examples of suitable compounds having the formula $R_3Al$ include $Me_3Al$, $Et_3Al$, $(iBu)_3Al$, and $(C_8H_{17})_3Al$.

After the magnesium halide support has been treated with the aluminum compound, it is contacted with a titanium alkoxyhalide compound having formula $Ti(OR')_{4-n}X_n$, e.g., $Ti(OCH_3)Cl_3$, $Ti(OC_2H_5)Cl_3$, $Ti(OC_4H_9)Cl_3$, $Ti(OC_8H_{17})Cl_3$, $Ti(OCH_3)_2Cl_2$, or $Ti(OC_2H_5)_2Cl_2$, to obtain a solid catalyst precursor containing titanium and magnesium halide. Contact reaction between the aluminum-treated support and the titanium halide is typically carried out such that the Ti/Mg atomic ratio is about 0.1 to about 2.0 and the reaction temperature is about 10 to about 60° C. for 1 to 4 hours in a non-polar solvent such as hexane or heptane.

The catalyst precursor is further treated with a mixture of dialkylmagnesium and the aluminum compound, wherein the amount of dialkylmagnesium is such that there is about 1 mmol of magnesium per gram of solid precursor catalyst. The reaction temperature is typically about 10 to about 60° C. in a non-polar solvent such as hexane or heptane.

Catalysts prepared as described above are capable of producing polymers having narrow molecular weight distributions and narrow compositional distributions. These catalyst compositions can be activated with ordinary alkylaluminum compounds as a co-catalyst. The alkylaluminum compounds are used in an amount that is effective to promote the catalytic activities of the solid catalyst component. Typically, the amount of alkylaluminum is sufficient to provide an aluminum to titanium molar ratio of about 2 to about 500, more typically about 2 to about 100, and most typically about 2 to about 30. Examples of suitable alkylaluminum compounds include trialkylaluminums such as triethylaluminum, tributylaluminum, trioctylaluminum, trimethylaluminum; dialkylaluminum halides such as diethylaluminum chloride and dibutylaluminum chloride; and alkylaluminum sesquichlorides such as ethylaluminum sesquichloride and butylaluminum sesquichloride.

One measure of molecular weight distribution for is melt flow ratio (MFR), which is the ratio of the high load melt index (HLMI or $I_{21.6}$) to the melt index (M.I. or $I_{2.16}$) of a given resin, that is:

MFR=HLMI/M.I.

For a regular resins, MFR values tends to increase as M.I. decreases and MFR values tends to decrease as M.I. increases. The melt flow ratio is believed to be an indication of the molecular weight distribution of the polymer and the higher the value, the broader the molecular weight distribution. Resins having relatively low MFR values for a given melt index M.I. typically have relatively narrow molecular weight distributions. Generally, resins having relatively low MFR values produce films of better strength properties than resins with high MFR values.

The average particle size (APS) and bulk density (B/D) of the support are two parameters that are related to the morphology of the support and which are important in the polymerization process. It is within the ability of one of skill in the art to decide the optimum APS and B/D for a support depending on their intended application.

The following examples are included to demonstrate particular embodiments of the invention. It should be appreciated by those of skill in the art that the techniques disclosed in the examples which follow represent techniques discovered by the inventor to function well in the practice of the invention, and thus can be considered to constitute some of the preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Preparation of magnesium halide support. $ZrCl_4$ (30 mmol) was mixed with 100 mL hexane and reacted with 120 mmol of 2-ethylhexanol at room temperature for 1 hour to yield a pale brown solution (A-1). Magnesium powder (132 mmol), 10 mL butylchloride, 400 mL hexane, and 0.23 g of iodine were introduced successively into 1-liter glass flask. An amount of zirconium solution (A-1) sufficient to provide 6 mmol of zirconium was added to the mixture. The mixture was heated to 60° C. for 1 hour to initiate the reaction. n-Butylchloride (15 mL) was added slowly over 4 hours. When the addition was complete, the reaction mixture was stirred at 70° C. for 2 additional hours and then cooled to room temperature (20° C.). The resulting precipitate was washed three times with hexane to yield granule type solid magnesium halide support having an average particle size of 50 μm.

Preparation of highly active catalyst. A hexane solution of triethylaluminum (100 mmol) was placed in 200 mL flask and 200 mmol of dicyclohexylamine was added slowly over 30 minutes followed by stirring for 1 hour to yield a pale yellow aluminum solution (B-1).

Magnesium halide support (3.0 g), as prepared above, was placed in a 500 mL flask with 150 mL hexane and 6 mmol of aluminum solution (B-1) was added. After 6 hour stirring at room temperature the liquid portion was decanted and the solid was washed with 200 mL hexane. 2-Ethylhexoxytitanium trichloride (15 mmol) and 150 mL hexane was added and the resulting slurry was stirred for 1 hour at room temperature. The liquid portion was decanted and the solid was washed with 500 mL hexane. Analysis results shows it contains 3.9% Ti, 18% Mg, and 3.0% Zr.

Ethylene polymerization. A 2.0 liter autoclave reactor was purged with nitrogen and charged with 1000 mL of purified hexane. The temperature was raised to 65° C. and 2.0 mmol of (n-$C_8H_{17}$)$_3$Al with 0.05 g of catalyst were injected. The autoclave was pressurized 16 psi with hydrogen, and ethylene was introduced to maintain total pressure at 90 psi. Polymerization was carried out at 85° C. for 1 hour. The resulting polymer suspension was filtered and dried. Polymerization results are summarized in Table 1.

EXAMPLES 2–4

A catalyst was prepared as described in Example 1 except that the amount of (A-1) was varied to provide the amount of zirconium listed below. Polymerization was carried out as described in Example 1 and results are listed in Table 1.

| Example | Zr amount | Average Particle size (μm) |
|---|---|---|
| 2 | 3 mmol | 75 |
| 3 | 12 mmol | 40 |
| 4 | 25 mmol | 30 |

EXAMPLE 5–8

Catalyst was prepared as described in Example 1 except that the alcohols listed below were used in place of 120 mmol of 2-ethylhexanol. Polymerization was carried out in the same way as in Example 1 and results are listed in Table 1.

| Examples | Alcohol | Amount |
|---|---|---|
| 5 | 2-ethylhexanol | 120 mmol |
| 6 | i-butanol/2-ethylhexanol | 60 mmol/60 mmol |
| 7 | i-propanol/2-ethylhexanol | 60 mmol/60 mmol |
| 8 | 2-ethylhexanol | 60 mmol |

EXAMPLE 9

Preparation of magnesium halide support. Magnesium powder (3.2 g), 400 mL hexane, and 0.23 g of iodine were introduced successively into a 1-liter glass flask. The mixture was stirred and heated at 80° C. When the temperature reached 80° C., 6.73 mmol of Al[O—CH($CH_3$)$C_2H_5$]$_3$ was introduced rapidly, followed by the slow addition of 30 mL of n-$C_4H_9$Cl over 4 hours, followed by further stirring at 80° C. for 2 additional hours. The mixture was cooled to room temperature (20° C.) and the resulting precipitate was washed three times with hexane to yield the solid magnesium halide support.

Highly active catalyst preparation. Triethylaluminum (100 mmol) was placed in 200 mL flask and 200 mmol of dicyclohexylamine was added slowly over 30 minutes and stirred for 1 hour to yield pale yellow aluminum solution (B-1).

Magnesium halide support (3.0 g), as prepared above, was placed in a 500 mL flask with 150 mL hexane and 6 mmol of aluminum solution (B-1). After stirring for 6 hour at room temperature, the liquid portion was decanted and the solid was washed with 200 mL hexane. Then, 15 mmol of 2-ethylhexoxytitanium trichloride and 150 mL hexane was added and the slurry was stirred for 1 hour at room temperature. The liquid portion was decanted and the solid was washed with 500 mL hexane. The resulting catalyst contained 4.2% Ti.

Ethylene polymerization. Polymerization was carried out in the same way as in Example 1 and results are listed in Table 1.

EXAMPLE 10–12

Preparation of magnesium halide support. For each replicant, triethylaluminum (40 mL of 1 M solution) was placed in 500 mL flask and diluted with 60 mL hexane. Slowly, 40 mmol of 2-ethylhexanol was added at 0° C. and consecutively 80 mmol of the alcohols listed below was added slowly at 0° C. to prepare aluminum alkoxy-compounds (A-2).

| Example | Alcohol |
|---|---|
| 10 | i-butanol |
| 11 | ethanol |
| 12 | i-propanol |

The magnesium halide support was prepared in the same way as in Example 9 except that 5 mmol of aluminum alkoxy compounds (A-2) prepared above were used in place of Al[O—CH($CH_3$)$C_2H_5$]$_3$.

Catalysts were prepared in the same way as in Example 9, followed by ethylene polymerization that was carried out in the same way as in Example 1. The polymerization results are listed in Table 1.

EXAMPLE 13

Preparation of high performance catalyst. Magnesium halide support was prepared in the same way as in Example 1. Triethylaluminum (100 mmol) was placed in 200 mL flask and 200 mmol of dicyclohexylamine was added slowly over 30 minutes, and stirred for 1 hour to make pale yellow aluminum solution (B-1). Dibutylmagnesium solution (20 mmol) in heptane and 40 mmol of aluminum solution (B-1) were mixed to form a clear solution. Without further separation or purification, this hexane solution was used as (B-2) solution.

Magnesium halide support (3.0 g), prepared as described above, was placed in 500 mL flask with 150 mL hexane 6 mmol of aluminum solution (B-1). After 6 hours stirring at room temperature, the liquid portion was decanted and the solid was washed with 200 mL hexane. 2-Ethylhexoxytitanium trichloride (15 mmol) was added with 150 mL hexane and the slurry was stirred for 1 hour at room temperature. The solution part was decanted and washed with 500 mL hexane. After make-up of hexane up to 150 mL, 3.0 mmol magnesium-amide complex (B-2) was added and the mixture was stirred at 40° C. for 3 hours to make a catalyst. Analysis results shows the catalyst contains 3.9% Ti and 19.1% Mg.

Ethylene polymerization. A 2.0 liter autoclave reactor was purged with nitrogen and charged with 1000 mL of purified hexane. The temperature was brought to 65° C. and 2.0 mmol of (n-$C_8H_{17}$)$_3$Al with 0.05 g of catalyst, as prepared above, were injected. The autoclave was pressurized with hydrogen and total pressure was brought to 6.0 kg/cm²-G with ethylene. The polymerization was carried out at 85° C. for 1 hour. After polymerization, the polymer suspension was filtered and polymer was dried to yield 160 g of polymer, having M.I. of 1.2 and MFR (21.6/2.16 kg/min) of 25.0, indicating a narrow molecular weight distribution.

Ethylene/1-hexene co-polymerization. A 2.0 liter autoclave reactor was purged with nitrogen and charged with 1000 mL of purified hexane. 1-Hexene (60 mL) was injected and the temperature was brought to 65° C. $(n-C_8H_{17})_3Al$ (2.0 mmol) with 0.05 g of catalyst, as prepared above, were injected and the autoclave was pressurized with hydrogen and total pressure was brought to 6.0 kg/cm²-G with ethylene. The polymerization was carried out at 85° C. for 30 min. After polymerization, methanol was added to quench the reaction and the polymer suspension was filtered and dried to yield 105 g of ethylene co-polymer having M.I. of 1.5, MFR (21.6/2.16 kg) of 24.2, Tm of 123.5° C., and a density of 0.925. These data indicate that the polymer has a narrow molecular weight distribution and compositional distribution.

EXAMPLE 14 (COMPARATIVE EXAMPLE)

Attempted preparation of catalyst in the absence of initiator or electron-donating solvent. Magnesium powder (3.2 g), 10 mL butylchloride, 400 mL hexane, and 0.23 g of iodine were introduced successively into 1-liter glass flask and the mixture was heated to 85° C. to in an attempt to initiate the reaction between the magnesium metal and the alkylhalide. After continued stirring for 3 hours, the reaction was not initiated and all of the magnesium powder remained unreacted. The catalyst could not be prepared and polymerization could not be carried out.

EXAMPLE 15 (COMPARATIVE EXAMPLE)

Preparation of magnesium halide support. A magnesium halide support was prepared according to U.S. Pat. No. 4,511,703. Dibutylmagnesium solution (500 mL of 1.0 M) in heptane and 50 mL of di-isoamyl ether were placed in a 1-liter glass reactor and the temperature was brought to 50° C. Over the span of 2 hours, 115 mL of t-butylchloride were added, dropwise. Following the addition, the suspension was reacted for 2 hours at 50° C. and the resulting precipitate was washed five times at 50° C. with 500 mL n-hexane. Even following the repeated washings, the magnesium halide support contains isoamyl ether.

Catalyst preparation. Triethylaluminum (100 mmol) was placed in a 200 mL flask and 200 mmol of dicyclohexylamine was added slowly over 30 minutes. The mixture was stirred for 1 hour to yield a pale yellow aluminum solution (B-1).

Magnesium halide support (3.0 g), as prepared above, was placed in a 500 mL flask with 150 mL hexane and 6 mmol of aluminum solution (B-1). After 6 hour stirring at room temperature, the liquid portion was decanted and the solid was washed with 200 mL hexane. 2-Ethylhexoxytitanium trichloride (15 mmol) was added with 150 mL hexane and the slurry was stirred for 1 hour at room temperature. The liquid portion was decanted and the remaining solid was washed with 500 mL hexane.

Ethylene polymerization. Polymerization was carried out as described in Example 1, but activity was much lower than the catalyst of Example 1, as listed in Table 1.

EXAMPLE 16 (COMPARATIVE EXAMPLE)

Reaction of magnesium and butylchloride in the presence of $Ti(OnPr)_4$. Magnesium powder (3.2 g), 400 mL hexane, and 0.43 g of iodine were introduced successively into 1-liter glass flask, and 0.7 g of $Ti(OnPr)_4$ and 0.3 mL BuCl were added. The mixture was heated to 85° C. to initiate the reaction and then the temperature was lowered to 80° C. At this temperature 30 mL of n-butylchloride was added over-3 hours. The resulting mixture was stirred for and additional 2 hours at 80° C. and then cooled to room temperature (20° C.). The solid precipitate was washed with hexane three times to yield the catalyst component.

Polymerization was carried out in the same way as in Example 1 and the magnesium halide support prepared above by itself shows substantial activity producing broad molecular weight distribution (MFR=34). Because this support itself is quite catalytically active, it is not suitable as a magnesium halide support for catalysts.

EXAMPLE 17 (COMPARATIVE EXAMPLE)

A catalyst was prepared according to U.S. Pat. No. 4,748,221. Magnesium powder (3.2 g), 400 mL hexane, and 0.43 g of iodine were introduced successively into 1-liter glass flask and the mixture was brought to 80° C. When temperature reached 80° C., 3.3 g of titanium tetrachloride and 5.0 g of $Ti(OnPr)_4$ were added, followed by the slow addition over 4 hours of 30 mL of n-butylchloride. The reaction mixture was stirred for an additional 2 hours at 80° C. and then cooled to room temperature (20° C.). The solid precipitate was washed with hexane three times to obtain a catalyst component Ethylene and ethylene/1-hexene polymerization. Polymerization was carried out as described in Example 13. Ethylene homo-polymerization produced 106 g polymer with a M.I. of 1.1 and MFR (21.6/2.16 kg) of 32.0, indicating much broader molecular weight distribution than the present invention.

Ethylene/1-hexene polymerization, which was carried out in the same way as in Example 13, produced 62 g ethylene co-polymer having a M.I. of 1.2, MFR (21.6/2.16 kg) of 30.2, Tm of 126.5° C., and density of 0.940. This density is much than that of the polymer produced using the catalyst of Example 13.

TABLE 1

| Example | Yield (g) | APS(*) (μm) | B/D(*) | M.I. |
|---------|-----------|-------------|--------|------|
| 1  | 270 | 700 | 0.35 | 2.0 |
| 2  | 280 | 780 | 0.33 | 1.6 |
| 3  | 260 | 500 | 0.32 | 2.3 |
| 4  | 290 | 350 | 0.36 | 2.5 |
| 5  | 260 | 650 | 0.30 | 1.8 |
| 6  | 280 | 660 | 0.32 | 1.5 |
| 7  | 260 | 680 | 0.33 | 1.4 |
| 8  | 290 | 670 | 0.35 | 1.6 |
| 9  | 280 | 460 | 0.29 | 1.7 |
| 10 | 270 | 370 | 0.35 | 1.2 |
| 11 | 250 | 350 | 0.32 | 1.3 |
| 12 | 300 | 480 | 0.32 | 1.1 |
| 13 | 160 | 500 | 0.35 | 1.2 |
| 14 | 0   | —   | —    | —   |
| 15 | 60  | 450 | 0.38 | 0.5 |
| 16 | 120 | 300 | 0.26 | 1.1 |
| 17 | 156 | 650 | 0.31 | 1.6 |

In light of the present disclosure, one of skill in the art will appreciate that one aspect of the present invention is a magnesium halide support for an olefin polymerization catalyst, wherein the magnesium halide support is prepared by providing magnesium and an alkylhalide in a non-polar hydrocarbon medium; providing a metal complex having the formula $M(OR)_nCl_m$ to the non-polar hydrocarbon medium to initiate a reaction between the magnesium and the alkylhalide, wherein M is zirconium or aluminum, n is from 1 to 4 and m is from 0 to 4, and R is hydrocarbon; and recovering the magnesium halide support. Typically, when M is zirconium, n is from 1 to 4 and m is from 0 to 3. Typically, when M is aluminum, n is from 1 to 3 and m is from 0 to 2.

A further aspect of the invention is a method of preparing a magnesium halide support for an olefin polymerization catalyst, the method comprising: providing magnesium and an alkylhalide in a non-polar hydrocarbon medium; preparing a zirconium complex by reacting a zirconium halide with an alcohol; providing the zirconium complex to the non-polar hydrocarbon medium to initiate a reaction between the magnesium and the alkylhalide, the reaction yielding a magnesium halide support; and recovering the magnesium halide support. According to one embodiment, the magnesium halide support has the formula $Mg_pX_q(OR)_rZr_s$ where R is alkyl, X is halide, and p, q, r, and s are numbers. According to one embodiment the zirconium halide is reacted with an alcohol such that the ratio of alcohol to zirconium is about 1 to about 6. According to one embodiment, the ratio of alkylhalide to magnesium in the hydrocarbon medium is about 0.5 to about 3. According to one embodiment, the ratio of zirconium to magnesium in the hydrocarbon medium is about 0.01 to about 1.0. According to one embodiment, the alkylhalide has the formula RX, wherein R is a branched or unbranched hydrocarbon having 2 to 14 carbon atoms, and X is a halide. According to one embodiment, R is selected from the group consisting of ethyl, propyl, butyl, pentyl, heptyl, and octyl. According to one embodiment, after the reaction is between magnesium and alkylhalide is initiated, additional alkylhalide is provided to the non-polar hydrocarbon medium in an amount sufficient to sustain the reaction until essentially all of the magnesium is consumed. According to one embodiment, the reaction between magnesium and alkylhalide is initiated at a temperature greater than about 50° C.

A still further aspect of the invention is a method of preparing a magnesium halide support for an olefin polymerization catalyst, the method comprising: providing magnesium and an alkylhalide in a non-polar hydrocarbon medium, providing aluminum alkoxide compound having the formula $Al(OR)_3$ wherein R is a hydrocarbon to the non-polar hydrocarbon medium to initiate a reaction between the magnesium and the alkylhalide, the reaction yielding a magnesium halide support, and recovering the magnesium halide support.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A solid support for an olefin polymerization catalyst, wherein the solid support is prepared by:
   providing magnesium and an alkylhalide in a non-polar hydrocarbon medium;
   providing a metal complex having the formula $M(OR)_nX_m$ to the non-polar hydrocarbon medium to initiate a reaction between the magnesium and the alkylhalide, wherein M is zirconium or aluminum, n is from 1 to 4 and m is from 0 to 3, R is alkyl, and X is a halide; and
   recovering the solid support, wherein the solid support consists essentially of a mixed alkoxy halide of magnesium and M and wherein the molar ratio of M to magnesium is about 0.01 to about 0.3.

2. The solid support of claim 1, wherein M is zirconium and the metal complex is obtained by the reaction between a zirconium halide represented by formula $ZrX_4$ with an alcohol represented by formula ROH; wherein the molar ratio of alcohol to zirconium is about 1 to about 6, wherein R is alkyl, and X is halide.

3. The solid support of claim 1, wherein the metal complex is an aluminum alkoxide compound represented by formula $Al(OR)_3$.

4. The solid support of claim 1 wherein M is zirconium and the molar ratio of alkylhalide to magnesium is about 0.5 to about 3.0.

5. The solid support of claim 1 wherein M is aluminum and the molar ratio of alkylhalide to magnesium is about 1.0 to about 3.0.

* * * * *